3,029,925
FEED DIVERTER FOR A LIVESTOCK FEEDER
John L. Martin, Wabash, and Eugene W. Cauffman and Shirley L. Parker, Claypool, Ind., assignors to Parker Feeders, Inc., Silver Lake, Ind., a corporation of Indiana
Filed Sept. 9, 1960, Ser. No. 54,889
5 Claims. (Cl. 198—64)

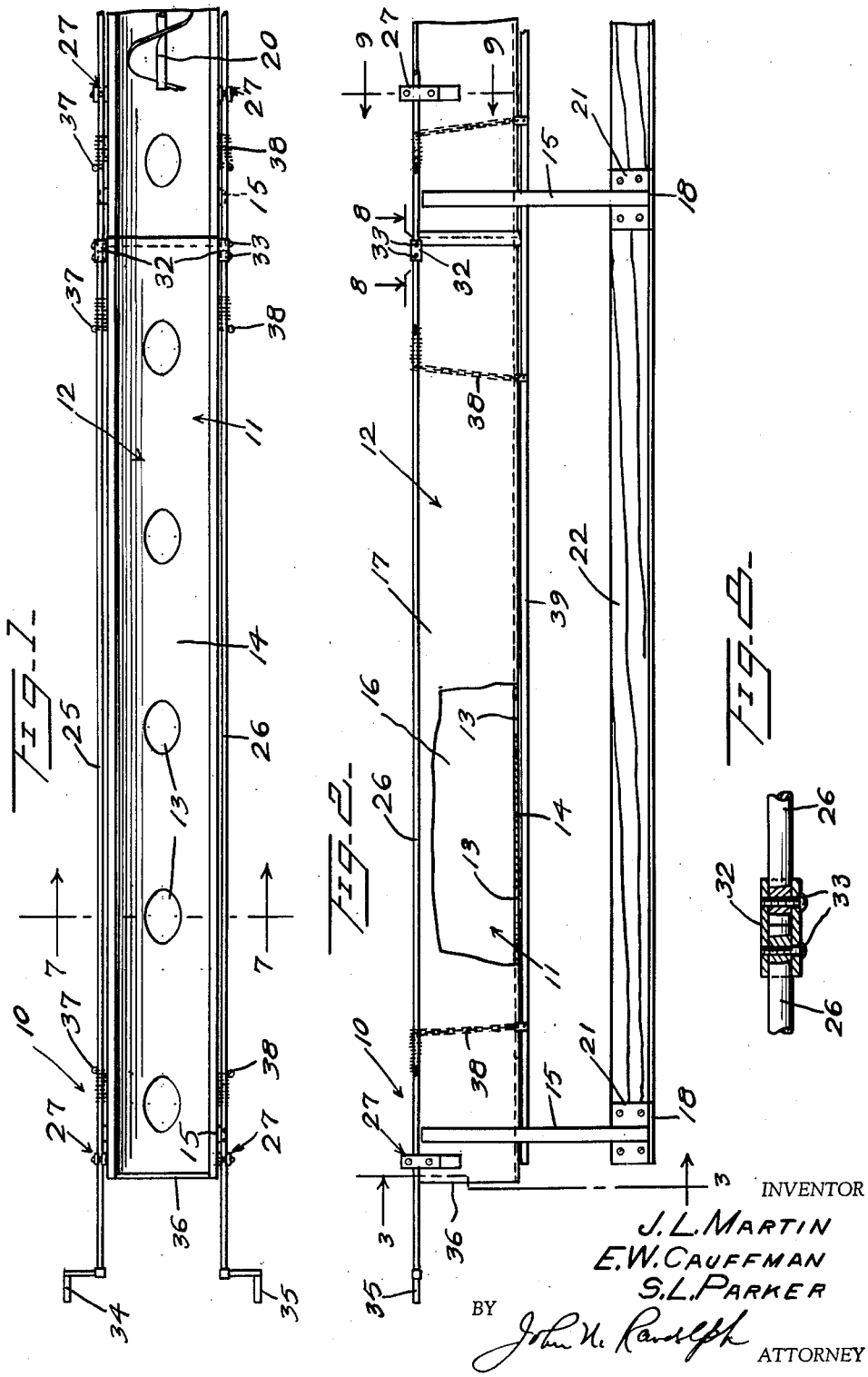

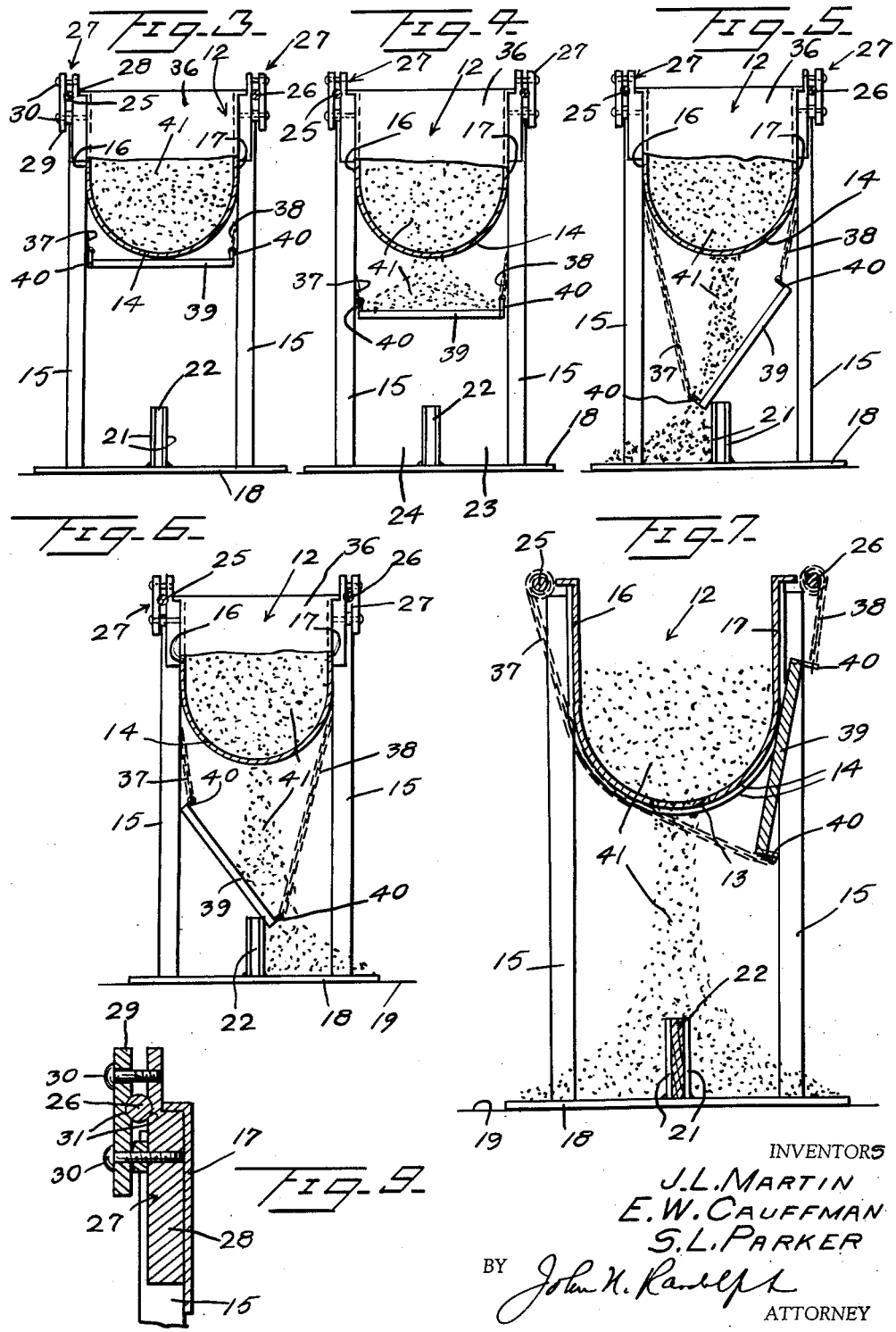

This invention relates to a diverter of extremely simple construction which is supported by and suspended beneath a feed conveyer and above a feed bunk into which the conveyer discharges for effectively controlling and directing a flow of feed from the conveyer to the bunk.

More particularly, it is an aim of the present invention to provide a diverter unit of extremely simple construction capable of being readily adjusted to a plurality of positions to enable an accurate control of the feed within the conveyer and which is discharged therefrom.

Various other objects and advantages of the invention will hereinafter become more fully apparent from the following description of the drawings, illustrating a presently preferred embodiment thereof, and wherein:

FIGURE 1 is a fragmentary top plan view of a conventional conveyer for livestock feed, shown equipped with the diverter unit;

FIGURE 2 is a fragmentary side elevational view thereof, partly broken away;

FIGURE 3 is a cross sectional view taken substantially along a plane as indicated by the line 3—3 of FIGURE 2, and on an enlarged scale;

FIGURE 4 is a view simliar to FIGURE 3 showing a second position of the diverter unit;

FIGURES 5 and 6 are views similar to FIGURES 3 and 4 but illustrating third and fourth positions of the diverter unit;

FIGURE 7 is an enlarged cross sectional view, taken substantially along a plane as indicated by the line 7—7 of FIGURE 1, and showing the diverter unit in another fifth position thereof;

FIGURE 8 is an enlarged fragmentary detailed sectional view, taken substantially along the line 8—8 of FIGURE 2, and FIGURE 9 is an enlarged fragmentary cross sectional view, taken substantially along a plane as indicated by the line 9—9 of FIGURE 2.

Referring more specifically to the drawings, the diverter unit in its entirety and comprising the invention is designated generally 10. For the purpose of illustrating one preferred application and use of the diverter unit 10, a portion of a conventional feed conveyer, designated generally 11, has been illustrated. The feed conveyer 11 includes an elongated trough 12 of substantially U-shaped cross section which is provided with longitudinally spaced discharge openings 13 in the bottom 14 thereof. The trough 12 is supported in an elevated, substantially horizontal position by uprights 15 which are secured to the sides 16 and 17 of said trough, in any conventional manner, and which extend downwardly therefrom. The lower ends of the transversely aligned uprights 15 rest upon and are secured in any conventional manner to transversely extending base plates 18. The plates 18 are adapted to rest on the ground or any other suitable supporting surface 19. Any suitable conveyer unit, such as a conventional power-driven auger conveyer 20, may be disposed for rotation in the trough 12 for conveying the feed therealong from right to left of the trough 12, as viewed in FIGURES 1 and 2. The base plates 18 have spaced upstanding bars 21 located midway between the uprights 15 and forming channels in which an elongated board 22 is supported on edge midway between said uprights 15, and which board extends from end-to-end of the trough 12 and provides a divider board for separating the right-hand feed bunk 23, located on one side of the divider board 22, from the left-hand feed bunk 24, disposed on the other left-hand side of the divider board, as viewed from left to right of FIGURES 1 and 2. The parts 11 to 24, inclusive, are all conventional.

The diverter unit 10 includes two elongated shafts 25 and 26 each of which is supported on the trough 12 by a plurality of bearing members 27. The bearing members 27 may each comprise a part 28 which is secured in any conventional manner in an upright position to an outer side of one of the side walls 16 or 17, and a part 29, as best seen in FIGURE 9, which is disposed on the outer side of the part 28 and connected thereto by screw fastenings 30. The parts 28 and 29 have opposed horizontally extending grooves 31, between the fastenings 30, in which a part of either the shaft 25 or 26 is journaled. The fastenings 30 can be adjusted for varying the spacing between the parts 28 and 29 for varying the frictional engagement of the grooves 31 thereof with the shaft, engaged therein, for varying the amount of torque required to effect rotation of the shafts in the bearings 27 thereof. Thus, the bearings 27 additionally provide brakes for the shafts 25 and 26, or one of the bearings 27 of each shaft may be additionally utilized as a brake by adjustment of the fastenings 30 thereof. The bearings 27 are disposed on the outer sides of the upper portions of the side walls 16 and 17, so that the shaft 25 is located on the outer side of and adjacent the upper edge of the side wall 16, and the shaft 26 is similarly disposed with respect to the side wall 17, as illustrated in FIGURES 3 to 7. Each of the shafts 25 and 26 may be composed of sections connected in end-to-end relation by coupling sleeves 32 and screw fastenings 33 which extend into said sleeves and engage said sections, as seen in FIGURE 8. Cranks 34 and 35 are secured to ends of the shafts 25 and 26, respectively, which extend beyond the end 36 of the trough 12, toward which the feed travels.

Chains 37 are secured to and extend downwardly from the shaft 25 and chains 38 are secured to and extend downwardly from the shaft 26, said chains being disposed at longitudinally spaced points along said shafts and each being secured at one end thereof to its shaft. A plank 39, of a length substantially equal to the length of the trough 12 and of a width slightly less than the spacing between the uprights 15 of each base plate 18, is disposed beneath the trough 12 and has attaching brackets 40 secured to each of its side edges at longitudinally spaced points. The lower ends of the chains 37 are secured to the attaching brackets 40, disposed along one side edge of the plank 39, and the lower ends of the chains 38 are secured to the attaching brackets 40 of the other side edge of said plank. The attaching brackets 40 are offset lengthwise from the ends of the chains which are secured to the shafts 25 and 26 so that the chains will be wound longitudinally on said shafts, when the shafts are rotated.

In FIGURES 1, 2 and 3 the diverter unit 10 is illustrated with the chains 37 and 38 wound to the same extent on the shafts 25 and 26, so that the diverter board 39 is disposed against the underside of the trough bottom 14 to close the discharge openings 13, so that none of the feed 41 will be discharged from the trough 12. In this position of the diverter board 39, the trough 12 can be uniformly filled with feed from end-to-end thereof.

The shafts 25 and 26 can be turned manually by their cranks 34 and 35, respectively, for unwinding the chains 37 and 38 to the same extent for lowering the diverter board 39 from its position of FIGURE 3 to its position of FIGURE 4, constituting the second position of the diverter board. In this second position, a classified amount of the feed 41 will be supported by the board 39 so that the feed supported by the diverter board may thereafter be discharged either into the bunk 24, as seen in FIGURE 5, or into the bunk 23, as seen in FIGURE 6, and the bunk thus charged with the feed will have a substantially uniform amount of feed from end-to-end thereof.

The shaft 25 may be turned for unwinding the chains 37 therefrom for lowering the edge of the board 39, to which the chains 37 are connected, relative to the other edge of the board, as seen in FIGURE 5, so that in this third position of the diverter unit 10, the feed 41 is discharged into the bunk 24 and additional feed flowing through the outlets 13 is deflected into the bunk 24 only. From the position of the diverter board in FIGURE 4, the shaft 26 can be turned, instead of the shaft 25, for unwinding the chains 38 for lowering the other right-hand edge of the board 39 to its fourth position of FIGURE 6, rather than its third position of FIGURE 5, so that the feed 41, supported by the board 39, is discharged only into the feed bunk 23 and additional feed flowing through the outlets 13 is also diverted only into the bunk 23.

The chains attached to one of the shafts, as for example the chains 37 attached to the shaft 25, may be completely unwound from said shaft and the chains 38 can be wound on the shaft 26 for positioning the diverter board 39 in its fifth position of FIGURE 7 completely to one side of the outlets 13, so that the feed discharged through the openings 13, unaffected by the diverter unit 10, will be separated uniformly by the divider board 22 so that equal amounts of the feed will be deposited in each of the feed bunks 23 and 24. This fifth position of FIGURE 7 is utilized primarily for filling the feed bunks 23 and 24 with a unified feed such as ensilage, which has not been mixed with an outside ration.

Various modifications and changes are contemplated and may be resorted to, without departing from the function or scope of the invention as hereinafter defined by the appended claims.

We claim as our invention:

1. In combination with an elongated substantially horizontally disposed conveyor for livestock feed having discharge openings in the bottom thereof and including means for supporting the conveyer in an elevated position; a diverter unit comprising a diverter board having side edges, and means supported by the conveyer and including elements connected to the side edges of the diverter board for suspending the diverter board beneath and longitudinally of the conveyer, said elements being individually adjustable for supporting the diverter board at different elevations and tilted laterally in either direction for controlling the discharge of feed from the conveyor and for directing the feed discharged laterally in either direction relative to said conveyer.

2. In combination with an elongated conveyor for livestock feed having discharge openings in the bottom thereof and means for supporting said conveyer in an elevated position and in substantially a horizontal plane; a diverter unit comprising an elongated diverter board, a pair of shafts, bearings supported by said conveyer and supporting and journaling said shafts in positions straddling the conveyer, flexible elements connected to and depending from said shafts, means connecting depending ends of the flexible elements of both shafts to said diverter board for suspending the diverter board beneath and longitudinally of the conveyer, the flexible elements of one of said shafts being connected to the diverter board in transversely spaced relation to the flexible elements of the other shaft, and means for selectively rotating said shafts for winding the flexible elements thereof on the shafts or for unwinding said flexible elements therefrom for varying the elevation of said diverter board and for tilting the diverter board laterally for controlling the discharge of feed through said openings and for deflecting the feed discharged laterally relative to the conveyer.

3. In a diverter unit as in claim 2, at least one bearing of each of said shafts including brake means for frictionally resisting rotation of the shaft for varying the amount of torque required for turning the shaft for winding or unwinding the flexible elements thereof.

4. A diverter unit as in claim 2, said means for selectively rotating the shafts comprising hand cranks fixed to complementary ends of the shafts and disposed beyond an end of said conveyor.

5. A diverter unit as in claim 2, each of said flexible elements comprising a chain.

References Cited in the file of this patent
UNITED STATES PATENTS

| | | |
|---|---|---|
| 1,314,755 | Peterson | Sept. 2, 1919 |
| 2,827,156 | Linder | Mar. 18, 1958 |
| 2,867,314 | Hansen | Jan. 6, 1959 |